United States Patent
Salter et al.

(10) Patent No.: US 10,064,256 B2
(45) Date of Patent: Aug. 28, 2018

(54) SYSTEM AND METHOD FOR REMOTE ACTIVATION OF VEHICLE LIGHTING

(71) Applicant: Ford Global Technologies, LLC, Dearborn, MI (US)

(72) Inventors: Stuart C. Salter, White Lake, MI (US); James J. Surman, Clinton Township, MI (US); Cornel Lewis Gardner, Romulus, MI (US); Annette Lynn Huebner, White Lake, MI (US); Pietro Buttolo, Dearborn Heights, MI (US); Scott Holmes Dunham, Redford, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/948,865

(22) Filed: Nov. 23, 2015

(65) Prior Publication Data

US 2016/0075275 A1    Mar. 17, 2016

Related U.S. Application Data (63) Continuation-in-part of application No. 14/086,442, filed on Nov. 21, 2013.

(51) Int. Cl.
*H05B 37/02* (2006.01)
*B60Q 3/80* (2017.01)
(Continued)

(52) U.S. Cl.
CPC .......... *H05B 37/0227* (2013.01); *B60Q 3/20* (2017.02); *B60Q 3/68* (2017.02); *B60Q 3/74* (2017.02); *B60Q 3/745* (2017.02); *B60Q 3/80* (2017.02)

(58) Field of Classification Search
CPC ..... F21V 14/003; G02B 3/14; G02F 1/13306; G02F 1/13718; G02F 2001/13756; G02F 2203/28; B60Q 3/74; B60Q 3/85; B60Q 3/43; B60Q 3/44; B60Q 3/76; B60Q 2400/40; B60Q 3/80; B60Q 3/16;
(Continued)

(56) References Cited

U.S. PATENT DOCUMENTS 2,486,859 A    11/1949    Meijer et al.
5,053,930 A    10/1991    Benavides
(Continued)

FOREIGN PATENT DOCUMENTS

CN    101337492 A    1/2009
CN    201169230 Y    2/2009
(Continued)

*Primary Examiner* — Alexander H Taningco
*Assistant Examiner* — Renan Luque
(74) *Attorney, Agent, or Firm* — Vichit Chea; Price Heneveld LLP (57) ABSTRACT

A lighting system for a vehicle is disclosed. The system comprises a controller in communication with at least one light source and an occupancy sensor. The controller is configured to control an activation emission output from the light source configured to charge a persistent luminescent portion. The controller is further configured to detect an occupancy of the vehicle and charge the luminescent portion by periodically outputting the activation emission. The controller determines the periodicity of the output based on the occupancy.

14 Claims, 4 Drawing Sheets

US 10,064,256 B2

Page 2

(51) Int. Cl.
*B60Q 3/68* (2017.01)
*B60Q 3/20* (2017.01)
*B60Q 3/74* (2017.01)

(58) Field of Classification Search
CPC .............. F21Y 2113/00; F21Y 2115/10; F21Y 2113/20; G01C 21/3626; G01C 21/3697
See application file for complete search history.

(56) References Cited

U.S. PATENT DOCUMENTS

| | | | |
|---|---|---|---|
| 5,434,013 A | 7/1995 | Fernandez |
| 5,709,453 A | 1/1998 | Krent et al. |
| 5,839,718 A | 11/1998 | Hase et al. |
| 6,031,511 A | 2/2000 | DeLuca et al. |
| 6,117,362 A | 9/2000 | Yen et al. |
| 6,294,990 B1 | 9/2001 | Knoll et al. |
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,118,441 B2 | 2/2012 | Hessling |
| 8,120,236 B2 | 2/2012 | Auday et al. |
| 8,136,425 B2 | 3/2012 | Bostick |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,286,378 B2 | 10/2012 | Martin et al. |
| 8,317,329 B2 | 11/2012 | Seder et al. |
| 8,317,359 B2 | 11/2012 | Harbers et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,459,832 B2 | 6/2013 | Kim |
| 8,466,438 B2 | 6/2013 | Lambert et al. |
| 8,479,423 B2 | 7/2013 | Martin et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,905,610 B2 | 12/2014 | Coleman et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 9,315,148 B2 | 4/2016 | Schwenke et al. |
| 9,568,659 B2 | 2/2017 | Verger et al. |
| 9,616,812 B2 | 4/2017 | Sawayanagi |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2005/0189795 A1 | 9/2005 | Roessler |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0133219 A1* | 6/2007 | Chaloult .................. B60Q 3/74 362/490 |
| 2007/0285938 A1 | 12/2007 | Palmer et al. |
| 2007/0297045 A1 | 12/2007 | Sakai et al. |
| 2008/0198613 A1* | 8/2008 | Cruickshank .......... B60Q 1/323 362/488 |
| 2008/0205075 A1 | 8/2008 | Hikmet et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2010/0253918 A1* | 10/2010 | Seder .................... G01S 13/723 353/13 |
| 2011/0012062 A1 | 1/2011 | Agrawal et al. |
| 2011/0180728 A1* | 7/2011 | Sawayanagi ............. B60Q 3/68 250/461.1 |
| 2012/0001406 A1 | 1/2012 | Paxton et al. |
| 2012/0020102 A1* | 1/2012 | Lambert ................. B60K 35/00 362/503 |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0050979 A1 | 2/2013 | Van De Ven et al. |
| 2013/0092965 A1 | 4/2013 | Kijima et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0175989 A1* | 6/2014 | Arai ......................... F21V 9/40 315/154 |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0288832 A1* | 9/2014 | Hoch ....................... B60L 3/12 701/538 |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |

(56) References Cited

U.S. PATENT DOCUMENTS

| | | |
|---|---|---|
| 2015/0291032 A1* | 10/2015 | Kim ................ B60K 37/06 |
| | | 701/36 |
| 2015/0307033 A1 | 10/2015 | Preisler et al. |
| 2016/0016506 A1 | 1/2016 | Collins et al. |
| 2016/0102819 A1 | 4/2016 | Misawa et al. |
| 2016/0131327 A1 | 5/2016 | Moon et al. |
| 2016/0236613 A1 | 8/2016 | Trier |
| 2017/0158125 A1 | 6/2017 | Schuett et al. |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |

* cited by examiner

SYSTEM AND METHOD FOR REMOTE ACTIVATION OF VEHICLE LIGHTING

CROSS-REFERENCE TO RELATED APPLICATION

This application is a continuation-in-part of U.S. Patent Application Publication No. 2015/0138789 A1, filed Nov. 21, 2013, and entitled "VEHICLE LIGHTING SYSTEM WITH PHOTOLUMINESCENT STRUCTURE." The aforementioned related application is hereby incorporated by reference in its entirety.

FIELD OF THE INVENTION

The present invention generally relates to a lighting apparatus and more specifically relates to a lighting apparatus for a vehicle storage compartment.

BACKGROUND OF THE INVENTION

Modern vehicles utilize various systems to improve convenience and ease of use. Some vehicles may utilize various illumination devices to enable occupants to more easily store and/or organize belongings in various storage compartments.

SUMMARY OF THE INVENTION

According to one aspect of the present invention, a lighting system for a vehicle is disclosed. The system comprises a controller in communication with at least one light source and an occupancy sensor. The controller is configured to control an activation emission output from the light source configured to charge a persistent luminescent portion. The controller is further configured to detect an occupancy of the vehicle and charge the luminescent portion by periodically outputting the activation emission. The controller determines the periodicity of the output based on the occupancy.

According to another aspect of the present invention, an illumination apparatus for a vehicle is disclosed. The illumination apparatus comprises a controller in communication with at least one light source, an occupancy sensor, and an ambient light sensor. The controller is configured to detect a light level via the ambient light sensor and determine an occupancy of the vehicle via the occupancy sensor. The controller is further configured to control an activation emission output from the light source to charge a persistent luminescent portion based on the light level and the occupancy.

According to yet another aspect of the present invention, an illumination system for a vehicle is disclosed. The system comprises a controller in communication with a first light source, a second light source, and an occupancy sensor. The controller is configured to determine an occupancy of the vehicle via the occupancy sensor. Based on the vehicle being occupied, the controller is configured to control a first activation emission from the first light source to charge a first persistent luminescent portion. Based on the vehicle being unoccupied, the controller is configured to control a second activation emission from the second light source to charge a second persistent luminescent portion.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The terms first, second, third, etc. as utilized herein may provide designations in reference to the figures for clarity. For example, a first portion and a second portion may be referred to in some implementations and only a second portion may be referred to in some additional implementations. Such designations may serve to demonstrate exemplary arrangements and compositions and should not be considered to designate a specific number of elements or essential components of any specific implementation of the disclosure, unless clearly specified otherwise. These designations, therefore, should be considered to provide clarity in reference to various possible implementations of the disclosure which may be combined in various combinations and/or individually utilized to clearly reference various elements of the disclosure.

The following disclosure describes a lighting system for a vehicle configured to illuminate a trim portion and/or textile portion disposed on a surface of a vehicle. The surface may correspond to various trim surfaces, panel surfaces, and/or fabric portions disposed in the vehicle. In some implementations, the system may be configured to selectively illuminate a portion of the vehicle, for example a surface of a trim panel in response to receiving a first emission of light from a light source. The surface portion may comprise a luminescent portion which may correspond to a coating or material dispersed within a panel forming the surface portion. The luminescent portion may be configured to emit light from the surface. In an exemplary embodiment, the luminescent portion may be of a persistent luminescent material configured to be charged by an emission from a light source.

The light source may be configured to emit light at a first wavelength, which may correspond to an activation emission or charging emission. The luminescent material or persistent luminescent material of the luminescent portion may be configured to utilize the first wavelength of the light to charge the luminescent material such that an output emission having at least a second emission may be emitted therefrom after the light source is deactivated. The first wavelength of the light may correspond to a first color of light and the second wavelength may correspond to a second color of light, different from the first color. While the various implementations of the lighting apparatus described herein refer to specific structures demonstrated in reference to at least one automotive vehicle, it will be appreciated that the lighting apparatus may be utilized in a variety of applications.

Figure 1:
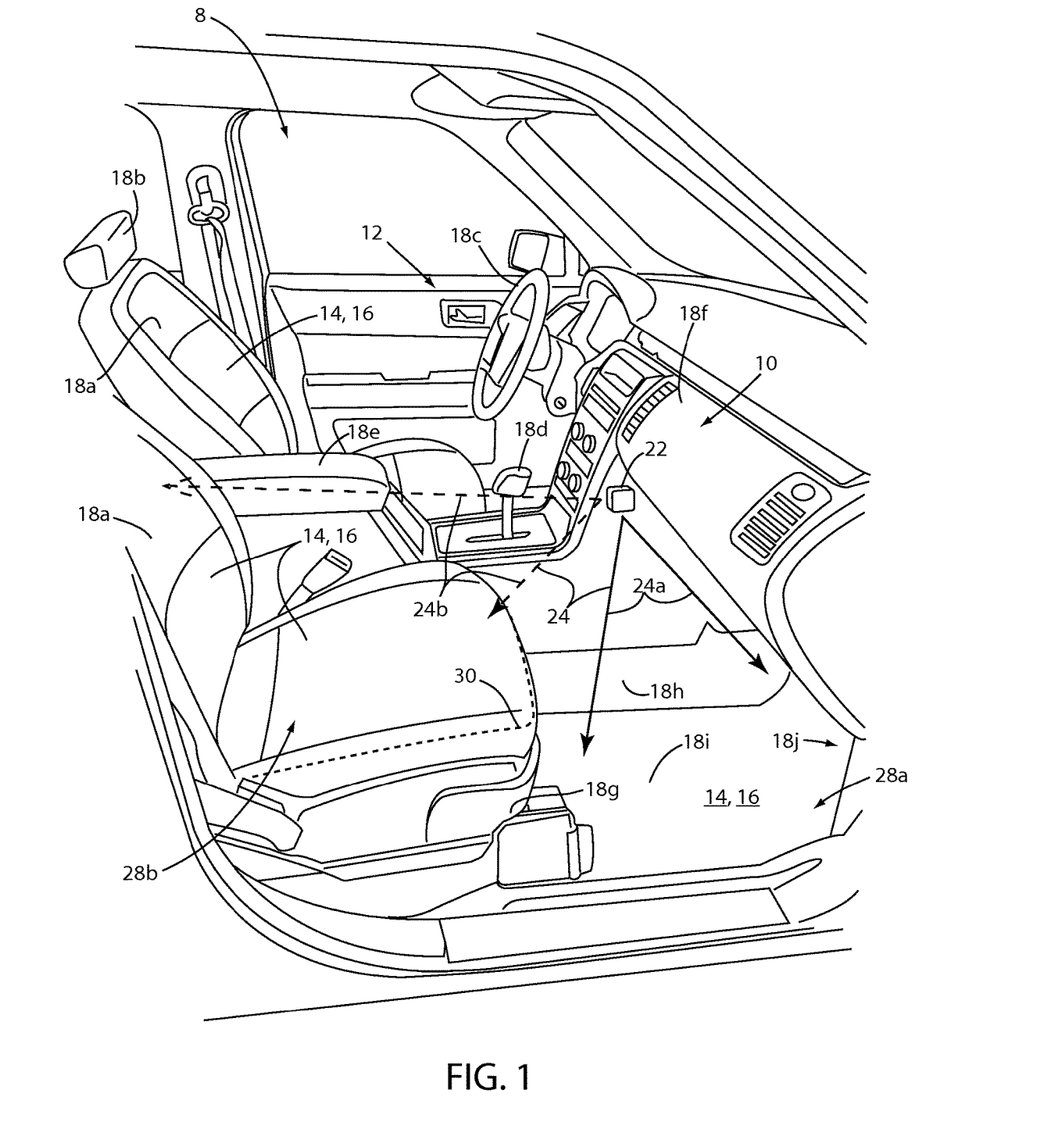
FIG. 1 is a perspective view of a passenger compartment of a vehicle demonstrating an illumination apparatus.
Figure 2:
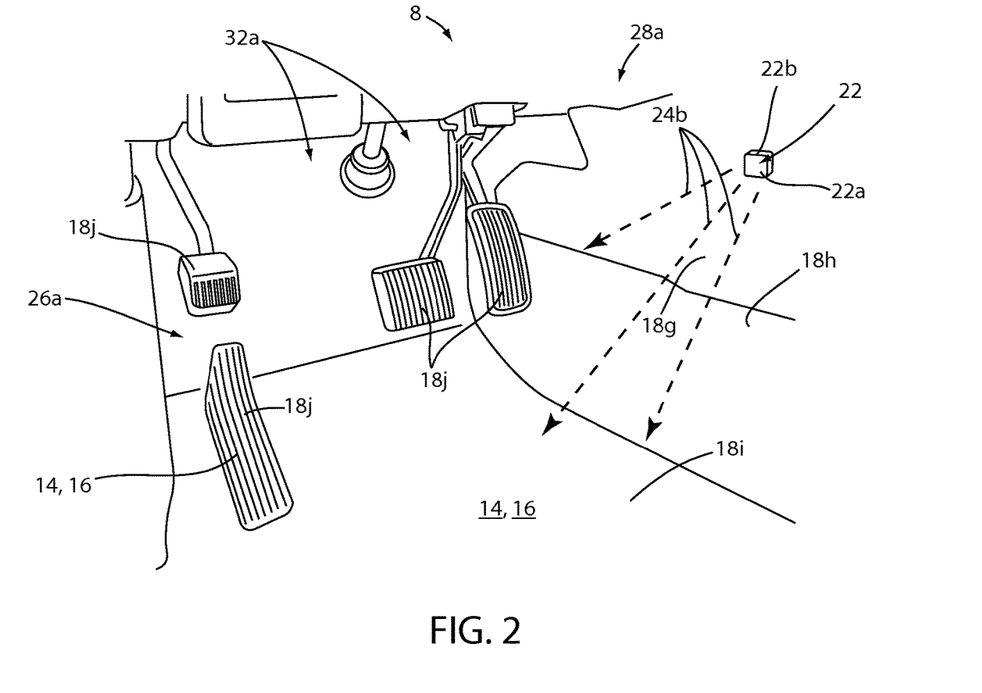
FIG. 2 is a perspective view of a lower portion of a passenger compartment of a vehicle demonstrating an illumination apparatus.
Figure 3:
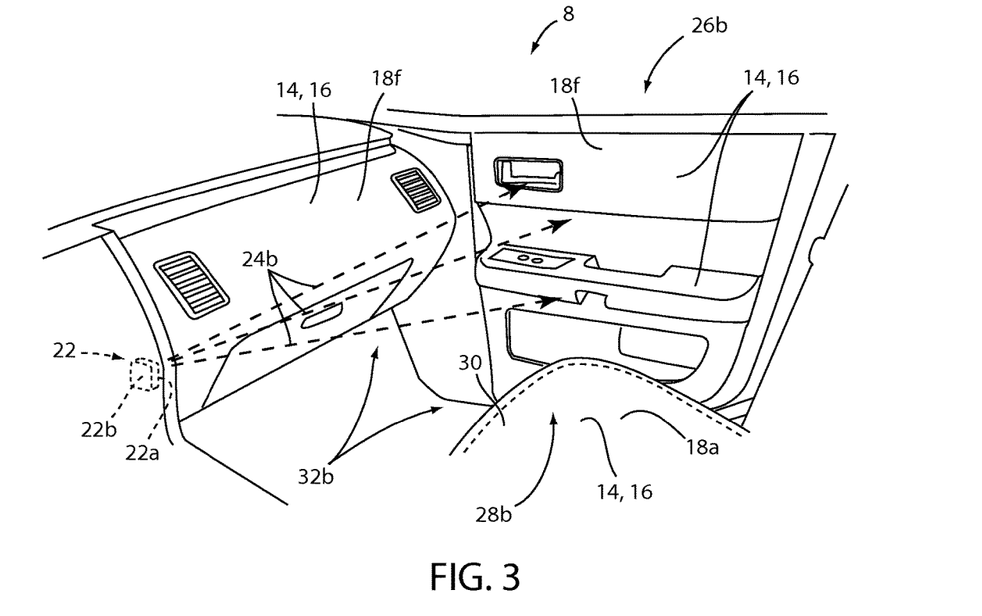
FIG. 3 is a perspective view of an upper portion of a passenger compartment of a vehicle demonstrating an illumination apparatus.

Referring to FIGS. 1-3, a passenger compartment 8 of a vehicle is shown having a lighting apparatus 10. The lighting apparatus 10 may form a portion of a lighting system 12 configured to illuminate and/or charge a luminescent portion 14 disposed on a surface 16 of the vehicle. The surface of the vehicle may correspond to a variety of surfaces and in some embodiments may correspond to an interior surface. The interior surface may correspond to a surface of a trim portion, a panel, a textile/fabric portion, or any surface of the vehicle. Examples of surfaces that may include the luminescent portion may correspond to a surface of a seat 18a, a headrest 18b, a steering wheel 18c, a shift lever 18d, a console 18e, an upper panel 18f, a lower panel 18g, a floor portion 18h, a floor mat 18i, a pedal or footrest 18j, or any other portion of the vehicle.

The lighting apparatus 10 may comprise a plurality of light sources 22. The light sources may correspond to a first light source 22a and a second light source 22b. Each of the light sources 22 that may be controlled by one or more lighting controllers incorporated in the vehicle. A lighting controller may be configured to selectively activate each of the light sources 22 in response to a variety of vehicle states. Examples of vehicle states may include a proximity detection of a key fob, a door lock actuation, an ignition sequence, a gear selection, etc. The light sources 22 may also be activated or deactivated by a switch or sensor, for example a toggle switch or proximity sensor. Further description of the lighting system 12 including the controller for the lighting are discussed in reference to FIG. 5.

The first light source 22a may be configured to output to a first activation emission 24a corresponding to an excitation or charging emission at approximately a first wavelength. The first activation emission 24a may be directed toward a first luminescent portion 26a. In response to receiving the first activation emission 24a, the first luminescent portion 26a may become excited and may further accumulate a charge in the form of a persistent luminescence. The first luminescent portion 26a may correspond to various surfaces of the vehicle, and in an exemplary embodiment, the first luminescent portion 26a may correspond to a lower portion 28a of the interior of the vehicle. In this configuration, the first light source 22a may provide for selective illumination of the lower portion 28a of the vehicle interior.

The second light source 22b may be configured to a second activation emission 24b corresponding to excitation or charging emission approximately at a second wavelength. The second activation emission 24b may be directed toward a second luminescent portion 26b. In response to receiving the second activation emission 24b, the second luminescent portion 26b may become excited and may further accumulate a charge in the form of a persistent luminescence. The second luminescent portion 26b may correspond to various surfaces of the vehicle, and in an exemplary embodiment, the second luminescent portion 26b may correspond to an upper portion 28b of the interior of the vehicle. In this configuration, the second light source 22b may provide for selective illumination of the upper portion 28b of the vehicle interior.

The lower portion 28a may correspond to various interior surfaces of the vehicle below a level of a seating deck surface 30. The level of the seating deck surface 30 is denoted by a broken line on a seat in FIG. 1. For example, the surfaces that may correspond to the first luminescent portion 26a may correspond to a lower panel 18g, a floor portion 18h, a floor mat 18i, a pedal or footrest 18j, or any surface located in the lower portion 28a. In this configuration, the lighting controller may selectively illuminate one or more surfaces in the lower portion 28a when the vehicle is idle or in operation without distracting an operator of the vehicle.

The upper portion 28b may correspond to various interior surfaces of the vehicle above or at approximately the level of the seating deck surface 30. For example, the surfaces that may correspond to the second luminescent portion 26b may correspond to a surface of a seat 18a, a headrest 18b, a steering wheel 18c, a shift lever 18d, a console 18e, an upper panel 18f, or any surface located in the upper portion 28b. In this configuration, the lighting controller may selectively illuminate one or more surfaces in the upper portion 28b and the lower portion 28a when the vehicle is idle and/or unoccupied. The lighting system 12 may provide for enhanced lighting of the interior when the vehicle is idle and/or unoccupied.

Each of the luminescent portions 26a and 26b may be configured to output a first output emission 32a and a second output emission 32b respectively. The luminescent portions 26a and 26b may comprise at least one luminescent material, for example a photoluminescent material or a persistent luminescent material configured to generate the output emissions 32a or 32b. The first output emission 32a may correspond to a third wavelength and the second output emission 32b may correspond to a fourth wavelength. The first output emission 32a may be generated in response to being excited and/or receiving a charge from the first light source 22a in the form of the first activation emission 24a. The second output emission 32b may be generated in response to being excited and/or receiving a charge from the second light source 22b in the form of the second activation emission 24b. In this configuration, each of the luminescent portions 26a and 26b may be selectively activated by the lighting controller.

The luminescent material(s) may be applied as a coating and/or dispersed in a material forming the surface or layer proximate to a surface of a particular luminescent portion. In an exemplary embodiment, at least one of the luminescent portions 26a and 26b may be of a persistent luminescent material configured to be charged by the first activation emission 24a or the second activation emission 24b. Additionally, persistent luminescent materials may be utilized to form each of the luminescent portions 14. In this configuration, at least one of the first luminescent portion 26a and the second luminescent portion 26b may be configured to emit an output emission for a duration of time extending after the respective activation emission 24a or 24b is deactivated and no longer emitted from the light sources 22.

Each of the output emissions 32a and 32b may correspond to a luminescence in the form of a photoluminescence and/or persistent luminescence. As utilized herein, both photoluminescence and persistent luminescence may correspond to light emitted from a luminescent portion. Persistent luminescence may be distinguished from photoluminescence as described herein due to a continued emission of light or luminescence being emitted from a luminescent portion 26a and/or 26b continuing for a significant period of time following the deactivation of the first activation emission 24a and the second activation emission 24b, respectively. A significant period of time may correspond to a duration exceeding approximately 30 seconds, but may correspond to a period of time up to or exceeding 30 minutes.

In an exemplary embodiment, at least one of the luminescent portions 26a and 26b comprises a persistent luminescent material. In such an embodiment, the lighting controller may selectively activate at least one of the light sources 22 to maintain a luminescence from at least one of the luminescent portions 14 by periodically emitting an activation or charging emission to charge the persistent luminescent material. The luminescence from the luminescent portion 26a, 26b may be maintained due to the persistent luminescence being output during periods when the activation emission (e.g. the first activation emission 24a or second activation emission 24b) is not being emitted from the respective light source 22a or 22b. In this way, the lighting system 12 may maintain an illumination from at least one of the luminescent portions 26a and 26b by periodically activating the light source 22a or 22b.

In operation, the activation emissions 24a and 24b may be emitted from the light sources 22a and 22b to illuminate and/or charge a persistent luminescent material of each of the luminescent portions 26a and 26b. The first wavelength and the second wavelength of the activation emissions 24a and 24b may correspond to an absorption range of wavelengths configured to excite and/or charge the respective photoluminescent and/or persistent luminescent materials of the luminescent portions 26a and 26b. The luminescent portions 26a and 26b may convert the activation emissions at the first wavelength or the second wavelength to the output emissions 32a and 32b having at least a third wavelength and a fourth wavelength, different from the first wavelength and the second wavelength. Each of the output emissions 32a and 32b may comprise one or more wavelengths, one of which may be longer than the first wavelength and the second wavelength.

In some embodiments, the first output emission 32a and/or the second output emission 32b may correspond to a plurality of wavelengths. Each of the plurality of wavelengths may correspond to significantly different spectral color ranges. For example, the first output emission 32a may correspond to a plurality of wavelengths configured to generate a first output color. The second output emission 32b may correspond to a plurality of wavelengths configured to generate a second output color. In some implementations, a plurality of wavelengths may be combined in the output emissions 32a and/or 32b to appear as substantially white light. The plurality of wavelengths may be generated by a red-emitting luminescent material having a wavelength of approximately 620-750 nm, a green emitting luminescent material having a wavelength of approximately 526-606 nm, and a blue or blue green emitting luminescent material having a wavelength of approximately 400-525 nm.

The persistent luminescent materials as discussed herein may correspond to phosphorescent materials. Persistent luminescent materials may correspond to alkaline earth aluminates and silicates, for example doped (di)silicates. Such substances may incorporate persistent luminescent phosphors or other doped compounds. Persistent luminescent substances may be doped with one or more ions, which may correspond to rare earth elements, for example: $Eu^{2+}$, $Tb^{3+}$, $Dy^{3+}$, and $R^{3+}$. Persistent luminescent materials may be defined as being operable to carry a charge and discharge light for a period of several minutes. For example, persistent luminescent materials as described herein may have an afterglow decay time longer than several minutes. The decay time may be defined as the time between the end of the excitation and the moment when the light intensity of the photoluminescent material drops below a minimum visibility of 0.32 $mcd/m^2$. The minimum visibility is roughly 100 times the sensitivity of the dark-adapted human eye, which corresponds to a definition used in the safety signage and by various researchers of luminescent properties.

A persistent luminescent material as discussed herein may be operable to emit light at an intensity of 0.32 $mcd/m^2$ after a decay time of 10 minutes. In an exemplary embodiment, a persistent luminescent material may be operable to emit light at an intensity of 0.32 $mcd/m^2$ after a decay time of 30 minutes and in some embodiments for a period longer than 60 minutes. In an exemplary embodiment, a persistent luminescent material may have a luminance ratio of greater than or equal to 20% of a first intensity after 10 minutes of decay time relative to a second intensity after 30 minutes of decay time. Additionally, in some embodiments, a persistent luminescent material may have a luminance ratio of greater than or equal to 10% of a first intensity after 10 minutes of decay time relative to a second intensity after 60 minutes of decay time.

As discussed herein, persistent luminescent materials may be operable to store energy received from an activation emission or a corresponding wavelength. The stored energy may then be emitted from the persistent luminescent material for a wide range of times, some extending up to approximately 24 hours. Such materials, when utilized in the luminescent portions 14 discussed herein make it possible to sustain light from the luminescent portions by periodically emitting the activation emissions 24 from the light sources 22. The periodic emission of the activation emissions 24 may provide for a substantially sustained charge of the persistent luminescent materials to provide for a consistent ambient illumination of the luminescent portions 14 of the vehicle.

The photoluminescent materials discussed herein may correspond to organic or inorganic fluorescent dyes configured to convert the activation emissions 24 to output emissions 32. For example, the photoluminescent materials may comprise a photoluminescent structure of rylenes, xanthenes, porphyrins, phthalocyanines, or other materials suited to a particular Stokes shift defined by an absorption range and an emission fluorescence. In some embodiments, the photoluminescent materials may be of at least one inorganic luminescent material selected from the group of phosphors. The inorganic luminescent material may more particularly be from the group of Ce-doped garnets, such as YAG:Ce. As such, each of the photoluminescent portions may be selectively activated by a wide range of wavelengths received from the activation emission configured to excite one or more photoluminescent materials to emit an output emission having a desired color.

As discussed herein, each of the luminescent portions 14 may comprise one or more photoluminescent and/or persistent luminescent materials. The luminescent portions 14 may be applied to any surface of the vehicle and may correspond to surfaces that may be impinged upon by an activation emission 24 as described herein. Additional information regarding the construction of photoluminescent structures to be utilized in at least one photoluminescent portion of a vehicle is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Jul. 31, 2012, the entire disclosure of which is incorporated herein by reference.

The light sources 22 as described herein (e.g. the first light source 22a and the second light source 22b) may correspond to any form of light source or light generating device. For example, the light sources 22 may correspond to one or more light generating devices such as halogen lights, fluorescent lights, light emitting diodes (LEDs), organic LEDs (OLEDs), polymer LEDs (PLEDs), solid state lighting or any other form of lighting. As such, the light sources 22 may be configured to emit a wide range of activation emissions 24 configured to correspond to the absorption ranges of the luminescent materials of each of the luminescent portions 26a and 26b.

Figure 4:
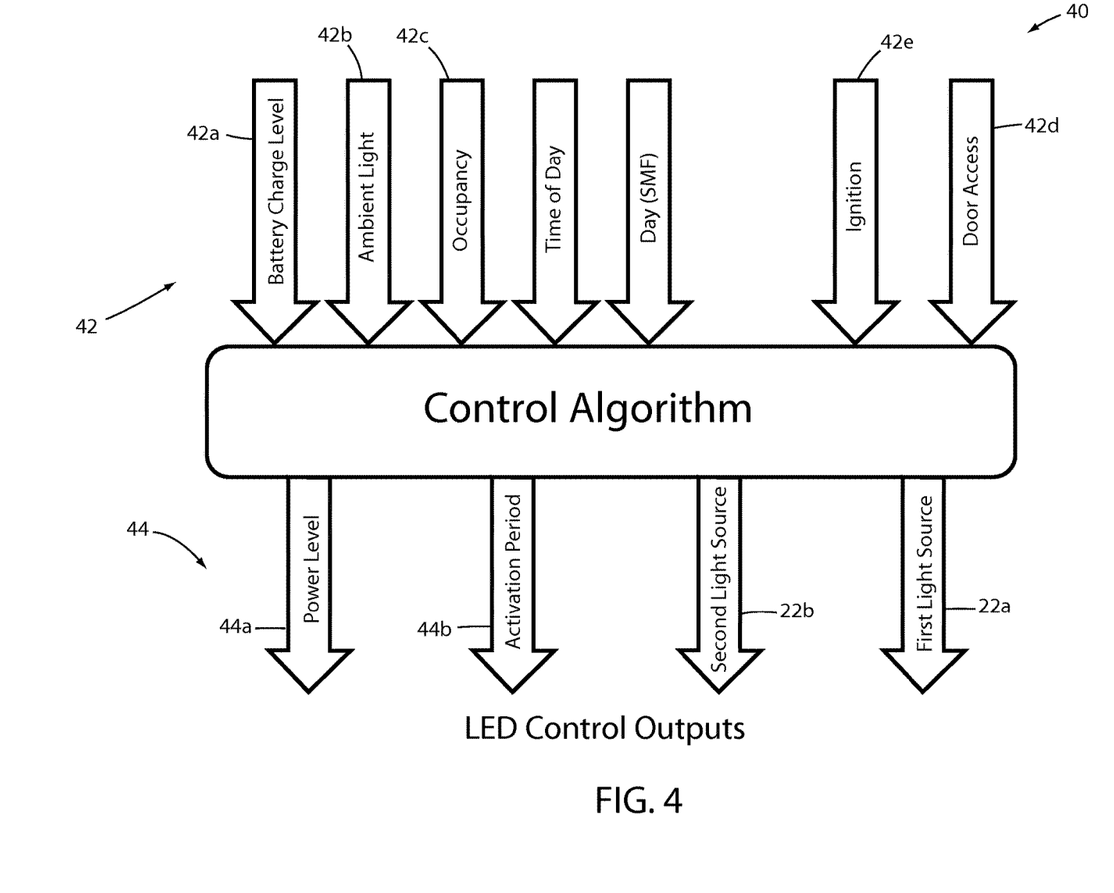
FIG. 4 is a process diagram demonstrating a plurality of control inputs utilized by a control algorithm of an illumination apparatus.

Referring now to FIG. 4, a control diagram 40 of the lighting system 12 is shown demonstrating a plurality of control inputs 42 that may be utilized by a control algorithm of the lighting controller to control the activation of each of the light sources 22. The control inputs 42 may correspond to signals received from various sensors incorporated in the vehicle, some of which may be communicated via a communication bus of the vehicle. The control inputs 42 may include any signals that may be communicated from one or more systems of the vehicle. Examples of control inputs may include a battery charge level 42a of the vehicle, an ambient light signal 42b from an ambient light sensor, an occupancy signal 42c from a vehicle occupancy sensor, a door access signal 42d from a vehicle door ajar sensor, and an ignition signal 42e from a vehicle ignition. Based on the control inputs, the lighting controller is configured to control the light sources 22.

For example, the lighting controller may be configured to selectively activate the lighting system 12 in response to the ambient light signal 42b communicating that ambient light proximate the vehicle has diminished below a predetermined level. The lighting controller may also selectively deactivate each of the light sources 22 in response to the battery charge level 42a being communicated as being below a predetermined charge level for operation of the lighting system 12. The lighting controller may also utilize the occupancy signal 42c, the door access signal 42d, and/or the ignition signal 42e to identify whether a passenger is inside the vehicle, has recently accessed the vehicle, and/or has recently operated the vehicle. In this way, the lighting controller may control the first light source 22a and the second light source 22b to provide for a novel and intuitive lighting algorithm to enhance the appearance of the interior of the vehicle.

In some embodiments, the lighting controller may be configured to control a plurality of control outputs 44 corresponding to the activation of the first light source 22a and the second light source 22b. The lighting controller may be configured to selectively activate each of the light sources 22. The lighting controller may also be configured to control a power level 44a and an activation period 44b of the light sources 22. The activation period may correspond to a timing of activation, which may correspond to a charging cycle of the light sources 22. In this configuration, the lighting controller may provide for the selective activation of each of the light sources 22 to selectively illuminate each of the luminescent portions 26a and 26b.

In some embodiments, the lighting controller may be configured to selectively control the power level 44a and the activation period 44b of each of the light sources 22 in response to at least one of the ambient light signal 42b and a time of day, which may be tracked by one or more timers of the lighting controller. In this configuration, the lighting controller may be configured to increase the power level 44a and/or adjust the activation period 44b of each of the light sources 22 in response to the ambient light signal 42b. For example, the lighting controller may increase a power level of at least one of the light sources 22 and/or increase a periodicity of the activation period 44b of at least one of the light sources 22 in response to the ambient light signal 42b and/or the time of day corresponding to a time wherein the ambient light level or daylight level may be low, which may be based on location and/or date. In this way, the lighting controller may be configured to adjust a lighting level of the output emissions 32 emitted from the luminescent portions 14 such that the output emissions 32 provide a desired level of light output corresponding to the ambient light level.

In an exemplary embodiment, the lighting controller of the lighting system 12 may be configured to detect and/or learn a usage pattern of the vehicle based on one or more of the control inputs 42. For example, the lighting controller may track and identify times of the day and days of the week (additionally calendar months) that correspond to a schedule of use of the vehicle. The lighting controller may identify that the vehicle is typically utilized during specific portions of the day (e.g. 7:00 AM-9:00 AM and 4:30 PM-6:15 PM Monday through Friday) by detecting usage of the vehicle based on the occupancy signal 42c, the door access signal 42d, and/or the ignition signal 42e. Based on the usage schedule of the vehicle, the lighting controller may selectively activate each of the light sources 22 such that when a passenger or operator of the vehicle approaches the vehicle, a persistent luminescent material utilized in at least one of the first luminescent portion 26a and the second luminescent portion 26b may be substantially charged. In this way, the lighting controller may provide for attractive ambient lighting to be emitted from the interior of the vehicle and significantly charged when use of the vehicle begins by a passenger or an operator of the vehicle.

For example, in an exemplary embodiment, the lighting controller may identify a period of usage of the vehicle and precede such a period by selectively activating the first light source 22a and/or the second light source 22b. The period of activation preceding the usage of the vehicle may correspond to a time required to significantly charge one or more persistent luminescent materials utilized in the luminescent portions 14. Upon detection of the passenger or operator of the vehicle, accessing or entering the vehicle, the lighting controller may deactivate the light sources 22 such that persistent luminescence is output in the form of at least one of the output emissions 32. As discussed herein, the lighting controller may identify an occupancy or access of the vehicle by monitoring one or more of the control inputs 42.

In some embodiments, the lighting controller may be configured to selectively charge or activate the first light source 22a corresponding to the lower portion 28a while the vehicle is in operation. Additionally, the lighting controller may attenuate an activation of the second light source 22b and/or suppress the activation of the second light source 22b while the vehicle is in operation. The suppression of the second light source 22b may be utilized in order to prevent the second luminescent portion 26b from emitting the second output emission 32b at a brightness level that may distract a passenger or occupant of the vehicle. In an exemplary embodiment, the activation of the second light source 22b may be suppressed by the lighting controller in response to the ignition signal 42e identifying that the vehicle is in operation and/or the occupancy signal 42c identifying that the vehicle is occupied. In this way, the lighting system 12 provides for attractive ambient lighting for both the lower portion 28a and the upper portion 28b of the passenger compartment 8 while also providing for the vehicle to be operated without substantial distraction from the luminescent portions 14.

Figure 5:
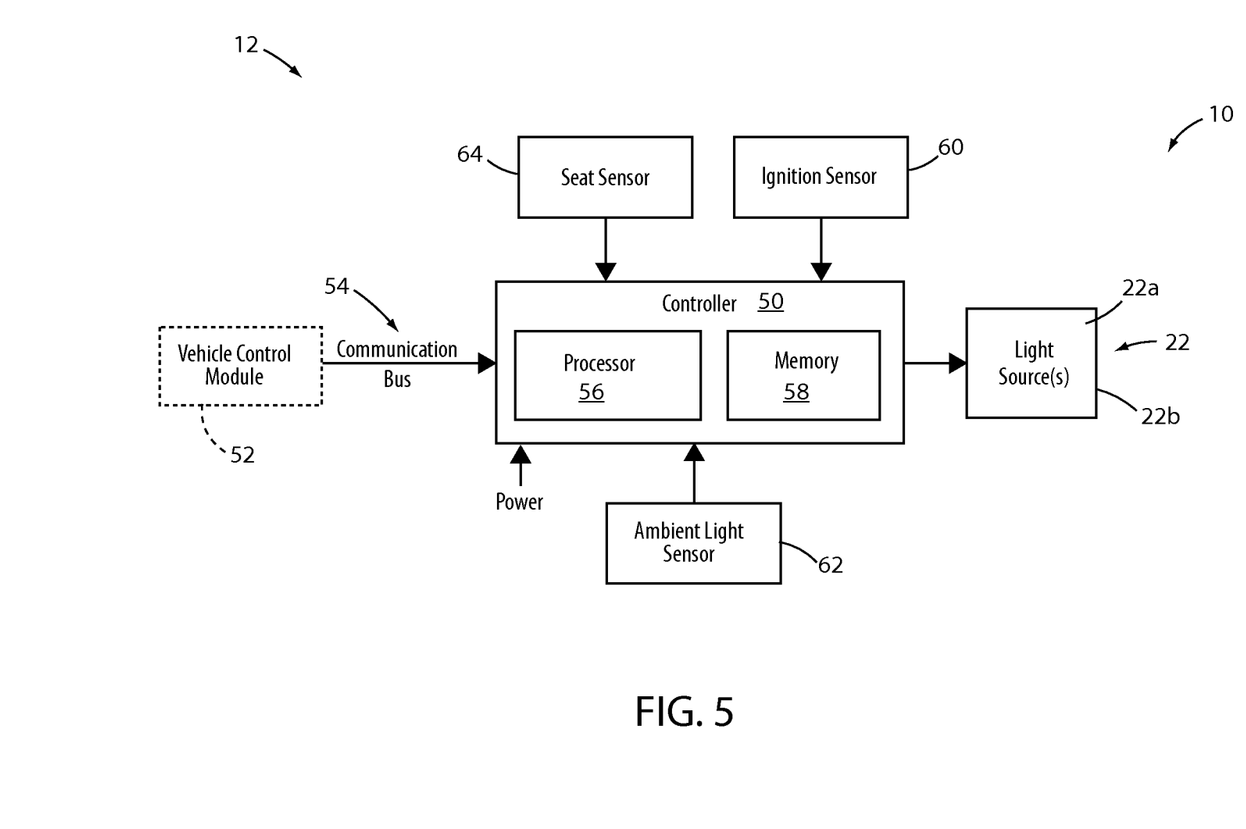
FIG. 5 is a block diagram of a lighting controller configured to control an illumination apparatus in accordance with the disclosure.

Referring to FIG. 5, a block diagram of a lighting controller or a controller 50, which may be configured to control the first light source 22a and the second light source 22b is shown. The controller 50 may be in communication with a vehicle control module 52 via a communication bus 54 of the vehicle. The communication bus 54 may be configured to deliver signals to the controller 50 identifying various states of the vehicle. For example, the communication bus 54 may be configured to communicate an operating condition of the vehicle (e.g. the ignition is active), an ambient light level, a seat occupancy, a door ajar signal, or any other information or control signals that may be communicated via the communication bus 54. In this way, the controller 50 may selectively activate the light sources 22 in response to one or more conditions communicated by the vehicle control module 52.

The controller 50 may include a processor 56 comprising one or more circuits configured to receive the signals from the communication bus 54 and output signals to control the light sources (e.g. 42 and 44) discussed herein. The processor 56 may be in communication with a memory 58 configured to store instructions to control the activation of the light sources 22. The controller 50 may further be in communication with an ignition sensor 60, an ambient light sensor 62, and a seat sensor 64. Each of the sensors 60, 62, and 64 may be configured to communicate signals to the controller 50 such that the controller 50 may identify an occupancy of the vehicle and the ambient light level. Based on the various inputs from the sensors 60, 62, and 64, as well as the communication bus 54, the controller 50 may selectively charge/activate each of the luminescent portions 26a and 26b based on a common usage timing or usage schedule of the vehicle.

The ambient light sensor 62 may be operable to communicate a light condition, for example a level brightness or intensity of the ambient light proximate the vehicle. In response to the level of the ambient light, the controller 50 may be configured to adjust a light intensity output from the light sources 42 and/or 44. The intensity of the light output from the light sources 42 and 44 may be adjusted by controlling a duty cycle, current, or voltage supplied to the light sources 42 and 44. In this configuration, the controller 50 may be operable to adjust the charge cycles, frequency and/or timing of the activation periods 44b of the activation emissions 24 to control a charge of the luminescent portions.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A lighting system comprising:
a persistent luminescent portion disposed on a surface; and
a controller in communication with a light source and an occupancy sensor, the controller configured to:
detect an occupancy of a vehicle based on the occupancy sensor;
control the light source to output a charging emission impinging upon the persistent luminescent portion at a first periodicity if the occupancy is detected and a second periodicity if no occupancy is detected, wherein the first periodicity corresponds to a different charging duty cycle than the second periodicity; and
wherein the controller is further configured to deactivate the charging emission of the persistent luminescent portion in response to a suspension of the occupancy exceeding a predetermined period of time.

2. The lighting system according to claim 1, wherein the occupancy sensor corresponds to at least one of a seat sensor, an infrared occupancy sensor, a driver alertness sensor, and an audio occupancy sensor.

3. The lighting system according to claim 1, wherein the light source is disposed on a portion of the vehicle remote from the persistent luminescent portion.

4. The lighting system according to claim 1, wherein the controller is configured to identify a use schedule of the occupancy of the vehicle to charge the persistent luminescent portion prior to vehicle use.

5. The lighting system according to claim 1, wherein the first periodicity corresponds to a higher charging duty cycle than the second periodicity.

6. The lighting system according to claim 1, wherein the controller is operable to determine a battery charge level of a battery of the vehicle.

7. The lighting system according to claim 1, wherein the controller is operable to deactivate the charging emission of the persistent luminescent portion in response to a charge level below a predetermined threshold.

8. An illumination system comprising:
a first persistent luminescent portion disposed on a first surface of a vehicle;
a second persistent luminescent portion disposed on second surface of the vehicle;
a controller in communication with a first light source, a second light source, and an occupancy sensor, wherein the controller is configured to:
determine an occupancy of the vehicle;
control a first activation emission from the first light source to charge the first persistent luminescent portion based on the vehicle being occupied; and
control a second activation emission from the second light source to charge the second persistent luminescent portion based on the vehicle being unoccupied.

9. The illumination apparatus according to claim 8, wherein the first light source is directed toward the first persistent luminescent portion disposed substantially below a passenger seating deck surface level.

10. The illumination apparatus according to claim 8, wherein the second light source is directed toward the second persistent luminescent portion disposed substantially above a passenger seating deck surface level.

11. The illumination apparatus according to claim 10, wherein the controller is configured to limit light emitted from the second persistent luminescent portion by suppressing a charging of the second persistent luminescent portion in response to the vehicle being occupied.

12. The illumination apparatus according to claim 10, wherein the controller is further configured to:
    identify an occupancy schedule of the vehicle based on the occupancy of the vehicle.

13. The illumination apparatus according to claim 10, wherein the controller is further operable to control the second activation emission from the second light source to charge the second persistent luminescent portion for a predetermined time period preceding an expected occupancy of the vehicle based on the occupancy schedule.

14. The lighting system according to claim 1, wherein the persistent luminescent portion is configured to accumulate a charge in response to a charging emission.

* * * * *